United States Patent [19]

Hosier et al.

[11] Patent Number: 5,543,838
[45] Date of Patent: Aug. 6, 1996

[54] SIGNAL MULTIPLEXING SYSTEM FOR AN IMAGE SENSOR ARRAY

[75] Inventors: Paul A. Hosier, Rochester; Jagdish C. Tandon, Fairport, both of N.Y.

[73] Assignee: Xerox Corporation, Stamford, Conn.

[21] Appl. No.: 359,354

[22] Filed: Dec. 19, 1994

Related U.S. Application Data

[63] Continuation of Ser. No. 113,928, Aug. 31, 1993, abandoned.

[51] Int. Cl.$^6$ .................................................... H04N 5/335
[52] U.S. Cl. .......................... 348/311; 348/280; 348/303; 348/304; 358/483
[58] Field of Search ..................................... 348/308, 311, 348/313, 320, 280, 482, 249, 250, 282, 298; 358/483; 377/63; H04N 5/335

[56] References Cited

U.S. PATENT DOCUMENTS

| | | | |
|---|---|---|---|
| 4,672,453 | 6/1987 | Sakamoto | 358/483 |
| 4,827,345 | 5/1989 | Nakagawa et al. | 358/482 |
| 4,896,216 | 1/1990 | Brunst et al. | 358/213.29 |
| 5,105,277 | 4/1992 | Hayes et al. | 348/313 |
| 5,148,268 | 9/1992 | Tandon et al. | 348/280 |

Primary Examiner—Wendy Garber
Assistant Examiner—Andrew B. Christensen
Attorney, Agent, or Firm—R. Hutter

[57] ABSTRACT

A photosensitive apparatus comprising a plurality of sets of photodiodes and a plurality of amplifiers, each amplifier being operatively connected to one set of photodiodes. A transfer circuit is associated with each photodiode for loading a charge from the photodiode to a storage node associated therewith. Readout means sequentially unload charges from each storage node in the set of transfer circuits through the amplifier, so that multiple photodiodes may operate through a single amplifier.

5 Claims, 5 Drawing Sheets

SIGNAL MULTIPLEXING SYSTEM FOR AN IMAGE SENSOR ARRAY

This is a continuation of application Ser. No. 08/113,928, filed Aug. 31, 1992, now abandoned.

This application incorporates by reference U.S. Pat. No. 5,105,277, assigned to the assignee hereof.

The present invention relates to image sensor arrays used in raster input scanners.

Image sensor arrays typically comprise a linear array of photosites which raster scan an image bearing document and convert the microscopic image areas viewed by each photosite to image signal charges. Following an integration period, the image signal charges are amplified and transferred to a common output line or bus through successively actuated multiplexing transistors. In the scanning process, bias and reset charges are applied in a predetermined time sequence during each scan cycle. Where the array employs two stage transfer circuits for transferring the image signal charges from the photosites, the bias charge is applied to each photosite through a charge injection transistor and the first transistor in the two stage transfer circuit. The reset charge is applied through a reset charge injection transistor and the second transistor of the two stage transfer circuit.

U.S. Pat. No. 4,896,216 discloses a linear sensor array having m groups of n sensor elements on an integrated circuit. Each of the groups are read out simultaneously, one sensor at a time. While the image-related charge on each photosensor is waiting to be read out, the charge on the photosensor is stored on a capacitor associated with, and parallel to, the photodiode of the photosensor. At read out, the charge is read directly from the capacitor to a shared amplifier, by the action of a transistor switch operated by a shift register.

U.S. Pat. No. 5,105,277 discloses a sensor array in which performance variations among different photosites in the array are canceled out by the injection of a "fat zero" bias via the middle node between first and second stage transfer transistors for transferring the image signal charge from the photodiode to an amplifier. This fat zero voltage sets a fixed and known bias charge on the photodiode. The two-stage process allows the charge on the photodiode to be transferred to the amplifier through the same transistors used to place the biased charge on the photosite originally, and as a result, transistor threshold variations across the array are canceled. The main purpose of the fat zero bias voltage being initially put on the photodiode node is to ensure transfer efficiency of collected charge on the photodiode, and thereby give a linear response to all levels of light detected by the photodiode.

According to the present invention, there is provided a photosensitive apparatus comprising a plurality of sets of photodiodes and a plurality of amplifiers, each amplifier being operatively connected to one set of photodiodes. A transfer circuit is associated with each photodiode for transferring a charge from the photodiode to a storage node associated therewith. Readout means sequentially unload charges from each storage node in the set of transfer circuits through the amplifier connected to the set of photodiodes and to a common output bus.

Figure 4:
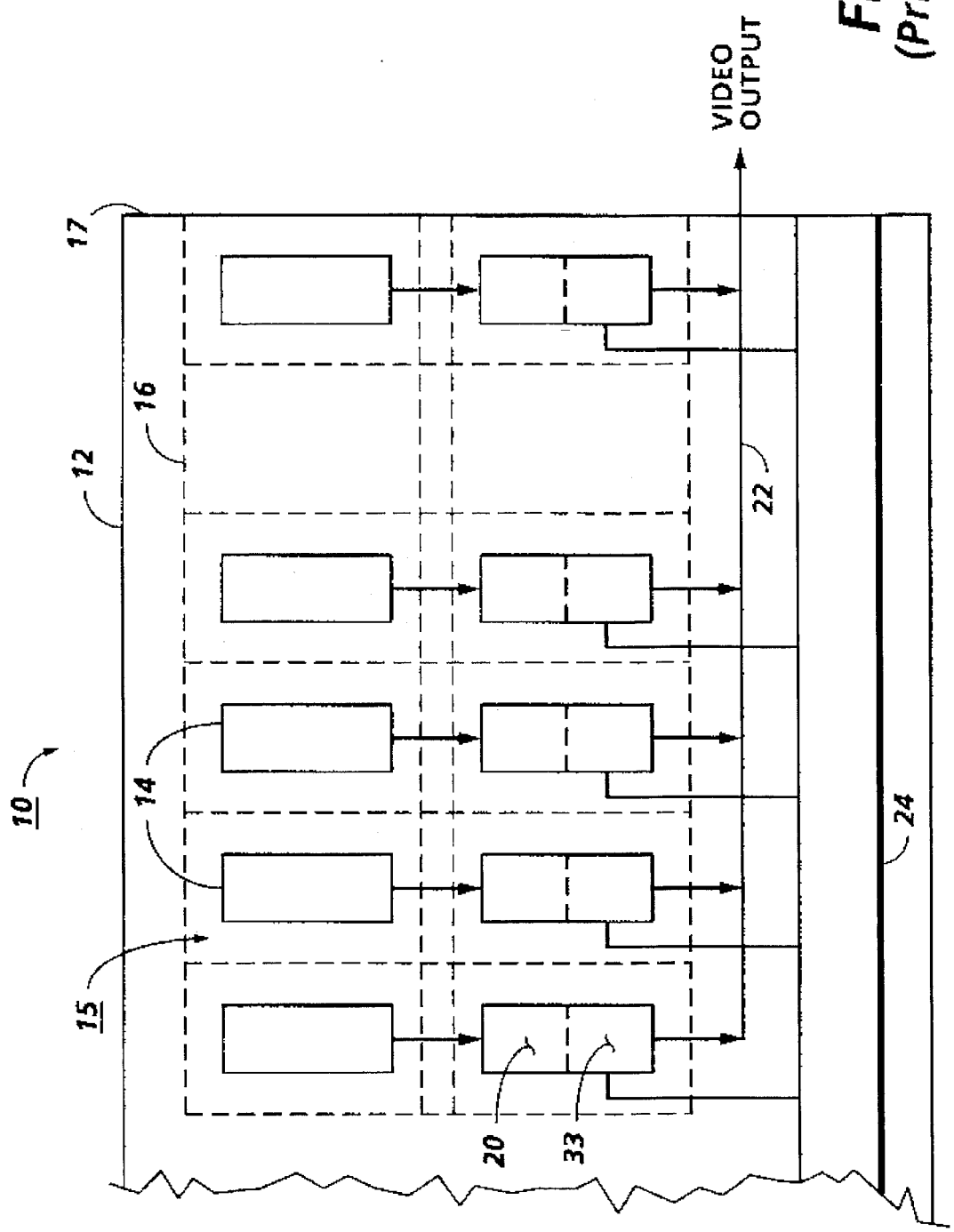
FIG. 4 is a schematic view of a prior-art image scanning array having an array of photosite cells, each cell having a photodiode with a two-stage transfer circuit for transferring image signal charges from the photodiodes to a common output bus.

Referring to FIG. 4, there is shown an image sensor array with two stage transfer, designated generally by the numeral 10, of a type of which the present invention is a modification. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e. a full width or contact array, with spacing between the photodiodes at the butted ends the same as the spacing between the photodiodes inside the chip, thereby maintaining photodiode pitch across the entire full length of the composite array (i.e., the full width of a document being scanned).

While photodiodes 14 are shown and described herein, transparent electrode MOS type photosites may be envisioned. Similar concepts could be applied to amorphous silicon photosites. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image charge signal from the photodiode is transferred by circuit 20 to amplifier 33 where the image signal charge from photodiode 14 is amplified to bring the image charge signal to a desired potential level prior to transferring the charge to a common video output line or bus 22. Suitable shift register and logic circuitry 24 provide timing control signals ΦPIXEL for connecting each pixel cell 15 to bus 22 in the proper timed sequence.

Image sensor array 10 may, for example, be used to raster scan a document original, and in that application, the document original and the sensor array 10 are moved or stepped relative to one another in a direction (i.e., the slow scan direction) that is normally perpendicular to the linear axis of array 10. At the same time, the array scans the document original line by line in the direction (i.e., the fast scan direction) parallel to the linear axis of the array. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

In the ensuing description, all transistors shown are N-channel type. However, P-channel transistors may instead be used with appropriate voltage level changes as will be understood.

Figure 5:
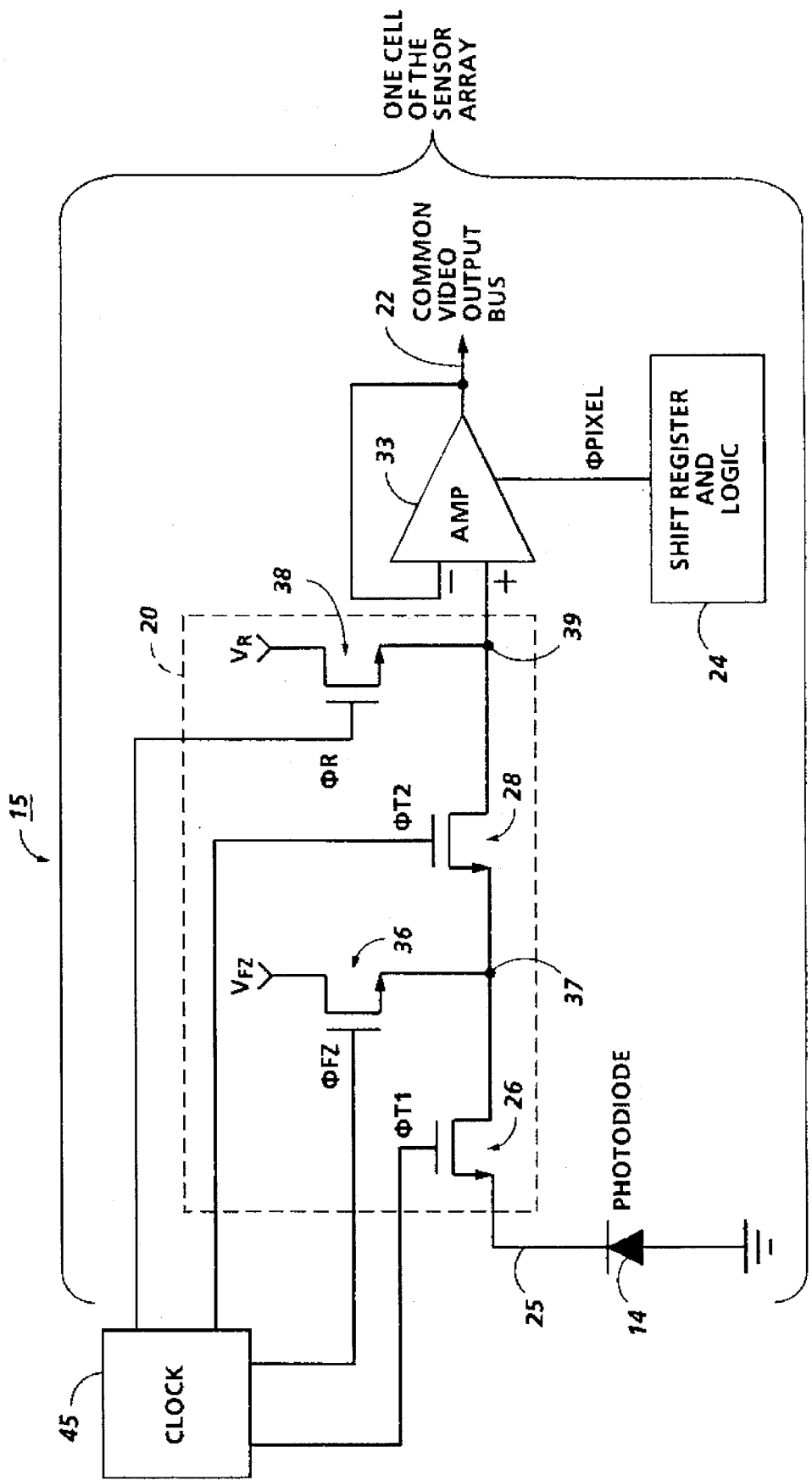
FIG. 5 is a circuit schematic showing details of a transfer circuit usable with the photodiodes of the present invention.

Referring particularly to FIG. 5, the two stage transfer circuit 20 of each cell 15 has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a preset bias charge, for example, an electrical fat zero $V_{FZ}$, to line 25 via node 37 and transistor 26. A reset charge injection transistor 38 controls injection of a reset signal from a predetermined reset signal source $V_R$ to node 37 via transistor 28, and at the reset node 39 at the input to amplifier 33.

A suitable clock generator 45 provides clock signals $\Phi_{T1}$ and $\Phi_{FZ}$ for timing injection of the preset bias charge $V_{FZ}$ into line 25 and clock signals $\Phi_{T2}$ and $\Phi_R$ for timing injection of the reset signal $V_R$ to line 25 at node 39. The $\Phi_{PIXEL}$ signals for multiplexing the amplified charge output by amplifier 33 onto the common video output bus 22 are provided by shift register and logic circuitry 24. A further detailed description of the real-time operation of such a two-stage signal transfer system may be found in U.S. Pat. No. 5,105,277, incorporated by reference herein.

Figure 1:
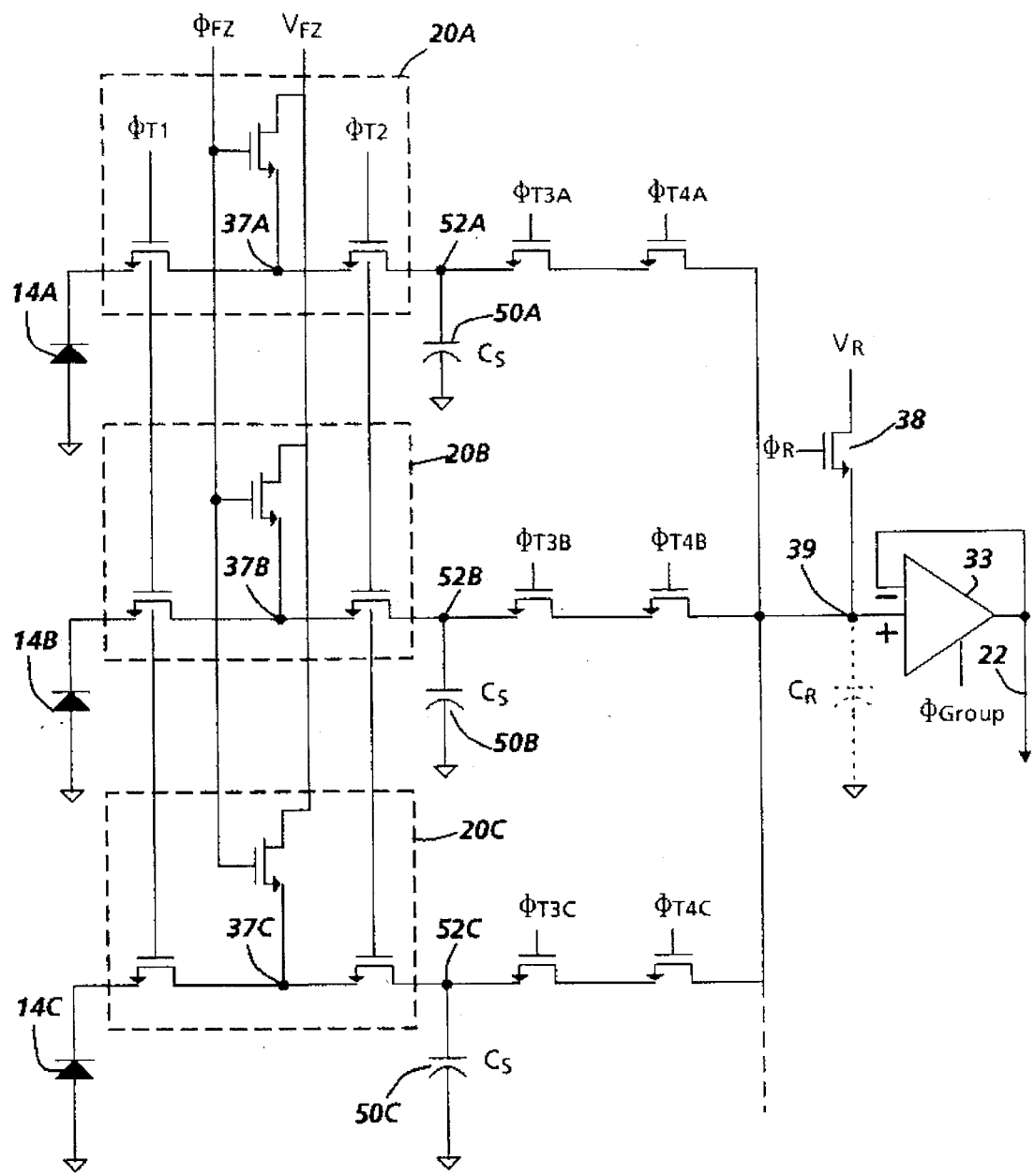
FIG. 1 is a circuit schematic showing details of a transfer circuit using the pixel-multiplexing scheme of the present invention.

Attention is now directed to FIG. 1, which illustrates the multiplexing system of the present invention. While each photosensitive diode in the array has its own dedicated two-stage transfer circuit to convey the signal on the photodiode to an amplifier, it is the intention of the present invention that a plurality of such photodiode/transfer circuit pairs share a single amplifier. As an image is being recorded by the array, with each cycle of use of the array, the charges associated with each photodiode are temporarily stored at a storage node disposed at the end of each transfer circuit. At read out, signals from each of the plurality of photodiodes are sequentially caused to pass through the shared pixel amplifier and then sent on to the common video output bus. In brief, the system of the present invention facilitates a sharing of a limited number of amplifiers within an array, so that fewer amplifiers are required to serve a given number of photodiodes.

With reference to FIG. 1, there is shown a three-photodiode embodiment of a pixel multiplexing system according to the present invention. In FIG. 1, it is to be understood that the three photodiodes, 14A, 14B and 14C, form part of a longer array in a relatively large-scale sensor. For example, the illustrated photodiodes may be three of as many as one thousand or more photodiodes in a commercially-viable sensor chip.

FIG. 1 further shows that each photodiode 14A, 14B and 14C is associated with a two-stage transfer circuit 20A, 20B, and 20C, respectively. These two-stage transfer circuits each function as described in detail with reference to the single two-stage transfer circuit 20, and all the elements thereof described above. It will be noted that each individual two-stage transfer circuit 20A, 20B, and 20C shares with the others a number of common control lines, particularly those lines for effecting the two-stage transfer within each transfer circuit, and also the timing and voltage inputs for the "fat zero" injection forming part of the two-stage transfer process. These various control lines are operated by the system each in the manner described in detail above with reference to the single-device system.

At the end of the circuit opposite the photodiode for each transfer circuit 20A, 20B, and 20C, there is shown a storage capacitor 50A, 50B, and 50C. Each of these capacitors, in parallel with the main line of the respective transfer circuit, creates a storage node 52A, 52B, and 52C at which a charge signal from the corresponding photodiode, having passed through the respective two-stage transfer circuit, is temporarily stored. The magnitude of this charge will, of course, be dependent on the original intensity of light on the photodiode corresponding to an individual portion of an image being scanned for that cycle. After the charge representative of the intensity of light on the photodiode is stored at the storage node, the charge "waits" to be transferred, as part of a readout routine, to the input of pixel amplifier 33. This readout is carried out by means of providing switching pulses, in a predetermined time sequence, to the transistors T3 and T4 for each storage node respectively.

Operatively disposed between each of the storage nodes 52A, 52B, and 52C and the amplifier 33 is a second two-stage transfer circuit, each comprising series transistors T3 and T4 for a given photodiode (T3A, T4A; T3B, T4B; . . . ). Further, operatively disposed between each second two-stage transfer circuit and the amplifier 33 is a common reset node 39, operable via a transistor 38 to apply a reset voltage $V_R$ to the transistors. Reset node 39 typically forms a virtual capacitance $C_R$ for temporarily storing charge thereat.

Figure 2:
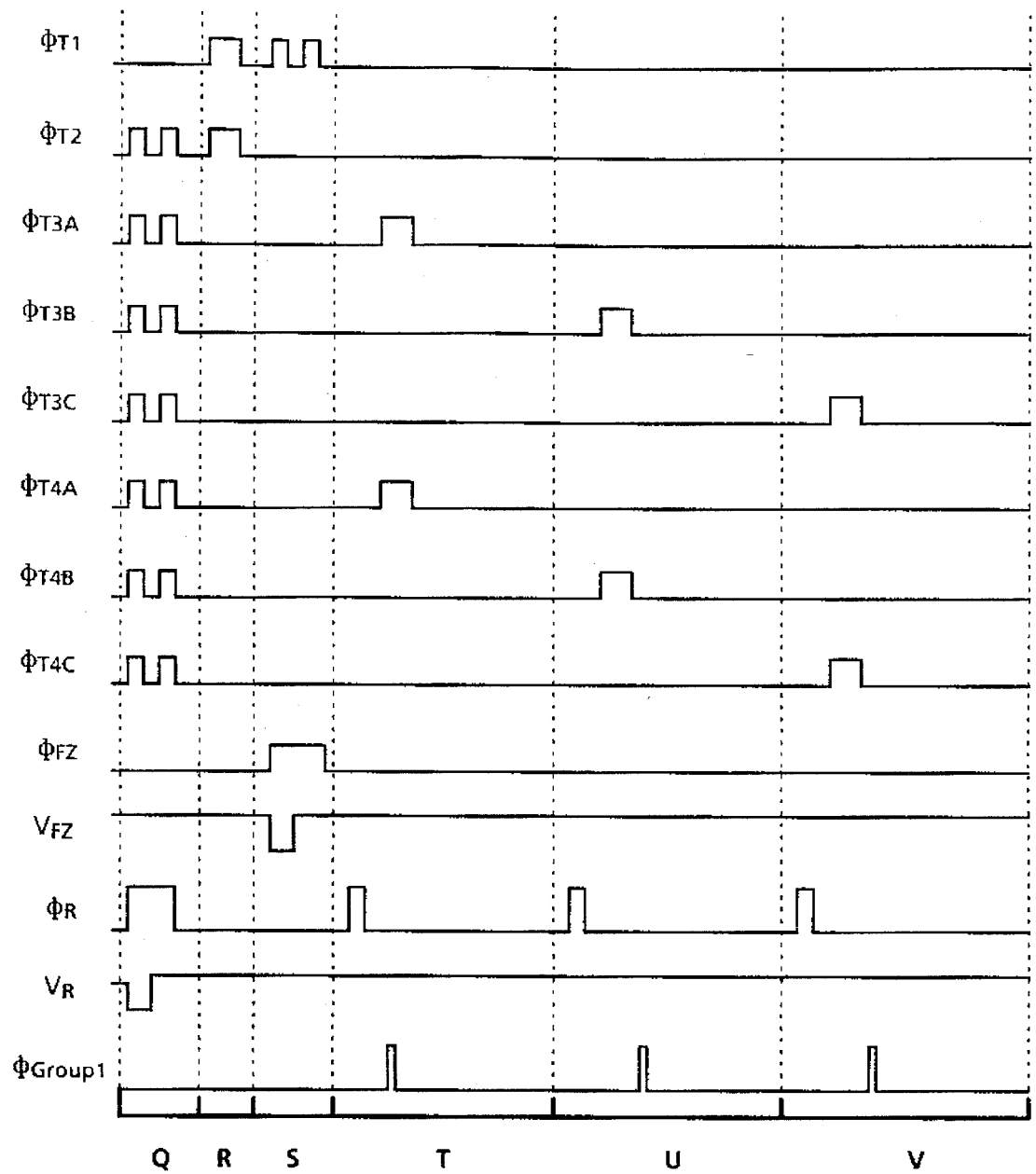
FIG. 2 is a timing diagram showing the operating clocking signal wave forms for the image scanning array shown in FIG. 1.

FIG. 2 is a timing diagram demonstrating how, once the storage nodes corresponding to each photodiode and transfer circuit pair are in place, these stored charges may be read out sequentially through the amplifier 33 and on to a common video output bus 22. As can be seen from FIG. 2, the readout is effected by activating both series transistors T3 and T4 for a given photodiode (T3A, T4A; T3B, T4B; . . . ) simultaneously until the charge is transferred to the reset node. Once the charge is transferred to the reset node, the pair of transistors T3, T4 are inactivated and then the pair of transistors T3, T4 are activated for the next photodiode in the sequence. It should be noted that one transistor, T3 or T4, will provide adequate transfer of charge.

Discussing FIG. 2 in detail, the clocking scheme is here divided into six separate sections marked Q, R, S, T, U, and V. During period Q, all of the middle nodes within each two-stage transfer circuit, marked as 37A, 37B, and 37C, and 52A, 52B, and 52C, are "filled and spilled" in a manner which is similar to that described for the prior art two-stage transfer process. During period R, the integrated signal charge is transferred from each photodiode into the intermediate storage node capacitors 50A, 50B, 50C. After this, during period S, the photodiodes can now each be reset by a "fat zero" injection through line $V_{FZ}$ so that they can start integrating light-generated charge once again, for the next line of input.

Time period T, which can overlap time period S, initiates a process of resetting the input of the amplifier at reset node 39 through transistor 38, and then all of the data on storage node 52A is transferred and the sequentially read out by selection of pixel amplifier 33. After all the data from the "A" group is read out the reset node 39 is once again reset in preparation for the read out of the "B" data, as is shown in time period U. The "C" data is obtained in a similar manner during the period marked V.

Figure 3:
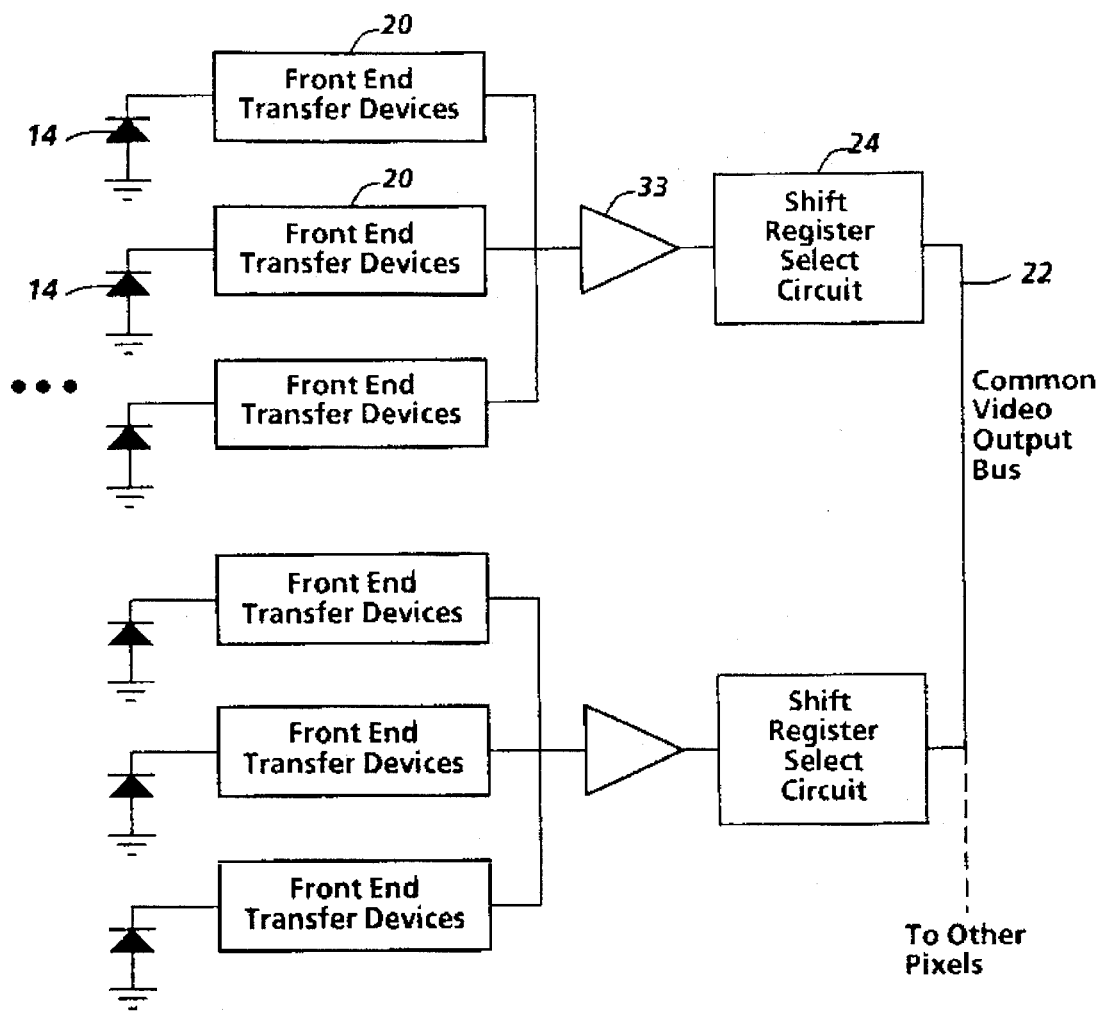
FIG. 3 is a simplified schematic view showing pluralities of photodiode and transfer-circuit pairs sharing a limited number of amplifiers.

FIG. 3 shows a simplified schematic of how a plurality of photodiodes and transfer circuits can share single pixel amplifiers, which in turn read out into shift register select circuits, so that a relatively large number of photodiodes may read out their data into a relatively smaller number of amplifiers, and yet manage to output data in an orderly fashion. Each pixel amplifier 33, which in operation will have a sequence of outputs from three photodiodes 14 passing therethrough, will enter the data stream through a portion of the shift register shown here as 24.

The proposed pixel multiplexing scheme preserves all the desirable features mentioned in prior art systems utilizing the two-stage transfer system, and, in addition, contains other important features. A reduction in die area required for amplifiers and pixel select circuitry is possible, with only a minor increase in pixel front end and clocking circuitry area.

This die area reduction translates into a higher yield and lower sensor array cost. Alternately, increased resolution may be possible by reducing the pixel size (i.e., the physical size of each photodiode in the array) without having to reduce the pixel amplifier size. With the amplifier-sharing of the present invention, less consideration need be given to the relative physical sizes of photodiodes and amplifiers, whereas, in a system wherein each photodiode has its own dedicated amplifier, the amount of "packing" of very small photodiodes is limited by the concomitant ability to pack an equal number of amplifiers onto a chip.

While the invention has been described with reference to the structure disclosed, it is not confined to the details set forth, but is intended to cover such modifications or changes as may come within the scope of the following claims.

We claim:

1. A sensor array, comprising:

a plurality of sets of photodiodes, each of said sets of photodiodes including a plurality of photodiodes;

a plurality of amplifiers, each of said plurality of amplifiers being operatively connected to one of said sets of photodiodes;

a first transfer circuit associated with each photodiode and having a storage node associated therewith, each storage node being associated exclusively with one photodiode, for transferring a charge from the photodiode to the storage node and injecting a discrete bias charge onto the photodiode;

a common output bus; and readout means for directly transferring a charge from a storage node to the amplifier associated with the set of photodiodes, the readout means including a second transfer circuit associated with each storage node, each second transfer circuit being operable independently. of any other second transfer circuit.

2. The apparatus of claim 1, wherein each transfer circuit includes a two stage transfer circuit coupling the photodiode with the storage node associated therewith, said two stage transfer circuit having first and second transistors disposed in series with one another; and timing control means for providing bias charge transferring split clock pulses to said first transistor to repeatedly actuate said first transistor and thereby fill and spill a bias charge onto the associated photodiode.

3. The apparatus of claim 1, further comprising a common reset line for injecting a bias charge of predetermined magnitude onto all photodiodes in one of said sets of photodiodes.

4. The apparatus of claim 1, wherein the second transfer circuit includes third and fourth transistors disposed in series with one another.

5. The apparatus of claim 4, wherein the second transfer circuit includes a reset node operatively disposed between the third and fourth transistors and the amplifier.

\* \* \* \* \*